US010423750B1

(12) United States Patent
Ginetti et al.

(10) Patent No.: US 10,423,750 B1
(45) Date of Patent: Sep. 24, 2019

(54) TECHNOLOGY DATABASE INDEPENDENT COMPONENTS FOR INTEGRATED CIRCUIT PACKAGE

(71) Applicant: CADENCE DESIGN SYSTEMS, INC., San Jose, CA (US)

(72) Inventors: Arnold Ginetti, Antibes (FR); Andrew Beckett, Wokingham (GB)

(73) Assignee: Cadence Design Systems, Inc., San Jose, CA (US)

( * ) Notice: Subject to any disclaimer, the term of this patent is extended or adjusted under 35 U.S.C. 154(b) by 108 days.

(21) Appl. No.: 15/792,618

(22) Filed: Oct. 24, 2017

(51) Int. Cl.
*G06F 17/50* (2006.01)

(52) U.S. Cl.
CPC ...... *G06F 17/5072* (2013.01); *G06F 17/5054* (2013.01); *G06F 17/5077* (2013.01)

(58) Field of Classification Search
CPC ............. G06F 17/5077; G06F 17/5072; G06F 17/5054
See application file for complete search history.

(56) References Cited

U.S. PATENT DOCUMENTS

| 7,506,277 | B1* | 3/2009 | Arora | G06F 17/5081 716/122 |
| 7,555,739 | B1* | 6/2009 | Ginetti | G06F 17/5045 716/107 |
| 7,562,328 | B1* | 7/2009 | Phaik | G06F 17/505 716/103 |
| 7,665,054 | B1* | 2/2010 | Gopalakrishnan | G06F 17/5072 716/122 |
| 8,082,528 | B2* | 12/2011 | Kim | G06F 17/5063 703/13 |
| 8,347,261 | B2* | 1/2013 | Ginetti | G06F 17/5068 716/102 |
| 8,516,418 | B2* | 8/2013 | Singh | G06F 17/5045 703/16 |
| 8,527,934 | B2* | 9/2013 | Ginetti | G06F 17/5068 716/104 |
| 8,627,264 | B1* | 1/2014 | Venkitachalam | G03F 1/68 716/111 |
| 8,707,226 | B2* | 4/2014 | Lu | G06F 17/5072 716/104 |
| 8,719,754 | B1* | 5/2014 | Ginetti | G06F 17/5072 716/119 |

(Continued)

*Primary Examiner* — Naum Levin
(74) *Attorney, Agent, or Firm* — Eric L. Sophir; Dentons US LLP

(57) ABSTRACT

Disclosed herein are embodiments of systems, methods, and products providing technology database independent pcells to be seamlessly customized and implemented in a yet unknown IC package library. In particular, the technology database independent pcells may have a code to execute callback functions to retrieve the package library name of the parent cells hosting the pcells. Based upon the library name, the pcell code may access the technology files stored in the technology database of the package library of the parent cells to retrieve the layer name, layer number, the design resolution, and/or other information such as design rule information of the parent cells hosting the pcells. Based on the layer number, the resolution, and/or other information the pcells can configure for themselves correct layout geometry without any input from a circuit designer.

20 Claims, 6 Drawing Sheets

(56) References Cited

U.S. PATENT DOCUMENTS

| | | | | |
|---|---|---|---|---|
| 8,789,008 B2* | 7/2014 | Chen | .................... | G06F 17/5068 |
| | | | | 716/119 |
| 8,910,100 B1* | 12/2014 | Wilson | ................ | G06F 17/5072 |
| | | | | 716/101 |
| 9,557,989 B2* | 1/2017 | Dobinson | ................. | G06F 8/71 |
| 10,068,046 B2* | 9/2018 | Davis | .................. | G06F 17/5068 |
| 2003/0028630 A1* | 2/2003 | Bischof | ............... | G06F 17/5068 |
| | | | | 709/223 |
| 2011/0307854 A1* | 12/2011 | Lu | ....................... | G06F 17/5072 |
| | | | | 716/119 |
| 2014/0007032 A1* | 1/2014 | Acar | ................... | G06F 17/5081 |
| | | | | 716/112 |
| 2016/0171149 A1* | 6/2016 | Alloatti | ............... | G06F 17/5081 |
| | | | | 716/52 |

* cited by examiner

TECHNOLOGY DATABASE INDEPENDENT COMPONENTS FOR INTEGRATED CIRCUIT PACKAGE

TECHNICAL FIELD

This application relates generally to the field of electronic circuit design, and more specifically to systems and methods for implementing technology database independent circuit components for designing an integrated circuit (IC) package layout.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for schematics, layouts, simulation, and verification of the complex circuits. EDA tools are also used in designing IC packages, the complexity of which has grown with the complexity of the IC designs.

An IC package generally provides housing for the semiconductor die that holds the integrated electronic circuit. The IC package further includes an interface array that contains a grid of pins or soldered balls to interface with the printed circuit board. The IC package also includes multiple and complex connections between the various input/output (IO) cells in the semiconductor die and the interface array for transmitting signals between the electronic circuit in the semiconductor die and the interface array. Such signals may include data signals and power provided to the electronic circuit. Furthermore, the IC package contains multiple discrete and embedded passive devices such as inductors, capacitors, and resistors for controlling the transmission of the signals and power in the connections between the semiconductor die and the interface array. In an IC package design, the various components such as the transmission lines, discrete devices, and embedded passive devices may be represented by parameterized/parameterizable/programmable cells, shortened as pcell (singular) or pcells (plural).

In an IC package with multiple routing layers, the transmission lines connecting the IO cells and the interface array have to be routed through multiple layers in the semiconductor die. Each of the layers of the semiconductor die has specific characteristics, for example the thickness of the metal, which governs the shape geometry of the transmission lines in the layer. In conventional EDA tools, a package designer has to create a unique library of transmission line layout cells for each layer, for instance by adapting pcells supplied by the EDA tools. For example, the library associated with a relatively higher layer will contain transmission line cells with a thicker geometry compared to the library associated with a relatively lower layer. It is cumbersome and inefficient to adapt pcells which are supplied by an EDA vendor to represent the multiple routing layers to suit the particular technology being used by the package designer.

It is similarly inefficient and cumbersome to adapt pcells supplied by an EDA vendor for the design layout of discrete and embedded passive components implemented within the routing layers of the IC design package. The discrete and embedded passive components within the IC design package, for example a discrete capacitor, have a layout footprint based upon the layer they are located. A package designer using conventional EDA tools captures the layout footprint of the discrete components prior to putting a package design together. When the layout footprint of the discrete components is so captured, the package designer does not have a way of knowing the layers that these discrete components will reside in. To get around this problem in the conventional EDA tools, the package designer has to define a library of the discrete components for each of the layers in the package by editing the pcells provided by the EDA tools/vendors, which is again cumbersome and inefficient.

What is therefore desired are automatically and intelligently customizable layout cells and electronic design automation (EDA) systems and methods implementing the customizable layout cells such that a package designer does not have to define a new cell library for every single routing layer of the package. In other words, what is required is a system library of layout cells such that the system library can be used seamlessly for future IC package layouts with yet unknown number of layers and the layout resolution of those unknown layers.

SUMMARY

Embodiments disclosed herein solve the aforementioned problems and other technological problems. In particular, the embodiments disclosed herein provide technology database independent pcells to be implemented in a yet unknown IC package library. In particular, the technology database independent pcells may have a code to execute call back functions to retrieve the package library name of the parent cells hosting the pcells. Based upon the library name, the pcell code may access the technology files stored in the technology database of the package library of the parent cells to retrieve information such as the layer name, layer number, the design resolution, and design rule information (for example, minimum spacing and width) of the parent cells hosting the pcells. Based on the retrieved information, the pcells can intelligently configure for themselves correct layout geometry without any input from a circuit designer. Therefore, the pcells are automatically and intelligently customized for any technology database that was not known when the pcells were generated. Furthermore, the embodiments disclosed herein provide a seamless transition between schematic views and layout views, wherein each of the schematic pcells may store the package library name and the layer name and the layout pcells may retrieve information such as the layer number, design resolution, and design rule information of the package design such that the layout pcells are intelligently configured. Furthermore, any of manual parameters updated in the layout pcells are updated in the schematic pcells and vice versa. Such seamless transition is also a significant improvement from the conventional systems of flattening the design when transitioning from the schematic view to the layout view or vice versa and losing significant connectivity information along the process.

In an embodiment, a computer implemented method comprises: instantiating, by the computer, a schematic pcell within a parent cell of an integrated circuit (IC) package design; executing, by the computer, one or more programs coded within the instantiated schematic pcell such that upon execution of the one or more programs the instantiated schematic pcell stores a name of the IC package library associated with the IC package design; further executing, by the computer, the one or more programs coded within the instantiated schematic pcell such that the instantiated schematic pcell retrieves a layer name of the parent cell from one or more technology files in a technology database associated with the IC package library; instantiating, by the computer, a layout pcell corresponding to the schematic pcell within the parent cell; executing, by the computer, one or more programs coded within the instantiated layout pcell such that upon execution of the one or more programs the instantiated layout pcell retrieves a layer number and a resolution of the IC package design from the technology database; and further executing, by the computer the one or more programs coded within the instantiated layout pcell such that the instantiated layout pcell is shaped with a geometry based upon the layer number and the resolution of the IC package design.

In another embodiment, a computer based system comprises: one or more computers comprising a non-transitory machine-readable media configured to store an integrated (IC) package library, a technology database associated with the IC package library, and a system library comprising a plurality of schematic pcells and corresponding layout pcells; at least one computer of the one or more computers, the at least one computer coupled to the non-transitory machine-readable media and comprising a processor configured to: instantiate a schematic pcell within a parent cell of an integrated circuit (IC) package design; execute one or more programs coded within the instantiated schematic pcell such that upon execution of the one or more programs the instantiated schematic pcell stores a name of the IC package library associated with the IC package design; further execute the one or more programs coded within the instantiated schematic pcell such that the schematic pcell retrieves a layer name of the parent cell from one or more technology files in the technology database associated with the IC package library; instantiate a layout pcell from the system library corresponding to the schematic pcell within the parent cell; execute one or more programs coded within the instantiated layout pcell such that upon execution of the one or more programs the instantiated layout pcell retrieves a layer number and a resolution of the IC package design from the technology database; and further execute the one or more programs coded within the instantiated layout pcell such that the instantiated layout pcell is shaped with a geometry based upon the layer number and the resolution of the IC package design.

BRIEF DESCRIPTION OF THE DRAWINGS

The accompanying drawings constitute a part of this specification and illustrate embodiments of the subject matter disclosed herein.

DETAILED DESCRIPTION

Figure 1:
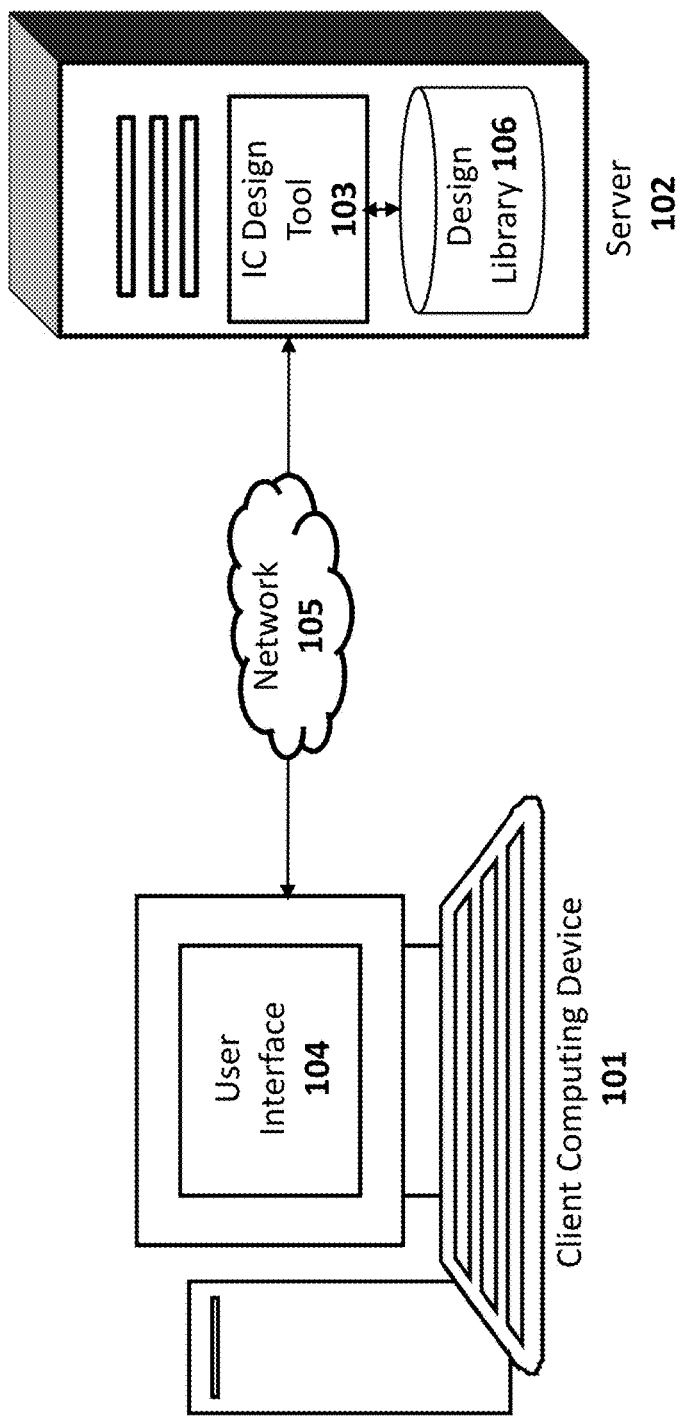
FIG. 1 shows an exemplary system implementing technology database independent pcells, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments of the systems, products and methods disclosed herein provide technology independent pcells that configure automatically and intelligently by picking up the environmental variables from the parent cells hosting the pcells. For example, when a circuit designer instantiates a schematic pcell, the schematic pcell may execute a callback function coded within the schematic pcell (using SKILL code for example) to retrieve the name of the package library that of parent cell hosting the schematic pcell. From the name of the package library, the schematic pcell may retrieve the layer name of the parent cell from a technology database of the package library. The schematic pcell may store both the library name and the layer name. In some embodiments, the library name may be hidden and layer name may be visible for a circuit designer to edit. When the circuit designer instantiates the layout pcell corresponding to the schematic pcell, the schematic pcell may transmit the stored library name and the layer name to the layout pcell. The layout pcell may then use the library name and the layer name to query one or more techfiles within the technology database to retrieve the layer number corresponding to the layer name and the resolution of the package library. Furthermore, the layout pcell may use the library name and layer name to query the one or more techfiles to retrieve other information such as design rules, for example minimum spacing between the components and the minimum width of the components. Based upon the layer number, resolution, and/or the other information, the layout pcell may automatically configure its geometrical parameters. Therefore, each of the schematic pcell and layout pcell is independent of the technology databases of various IC packages.

FIG. 1 illustrates an electronic design automation (EDA) system 100, according to an exemplary embodiment. The electronic design automation system 100 may include any number of computing devices; the exemplary embodiment may include a client computing device 101 and a server 102. One or more components of the electronic design automation system 100 may be grouped and referred to as an electronic design automation tool (or EDA tool). The client 101 may be connected to the server 102 via hardware and software components of one or more networks 105. In some embodiments, the system 100 may be a cloud-based system wherein one or more functionalities of the system 100 may be performed by one or more cloud computing devices. A network 105 may also connect various computing devices with databases or other components of the system 100.

Examples of the network 105 include, but are not limited to, Local Area Network (LAN), Wireless Local Area Network (WLAN), Metropolitan Area Network (MAN), Wide Area Network (WAN), and the Internet. The communication over the network 105 may be performed in accordance with various communication protocols, such as Transmission Control Protocol and Internet Protocol (TCP/IP) User Datagram Protocol (UDP), and IEEE communication protocols.

A client device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client device 101 may be configured to communicate with one or more servers 102 of the system 100 through one or more networks 105, using wired and/or wireless communication capabilities. A user interface 104 may include a Graphical User Interface (GUI) that renders an interactive, graphical representation of an IC design, layout, schematic, or other logical representation of an IC that is being designed and optimized using an IC design tool 103. The GUI 104 may provide interactive elements, such as graphical representations of IC design elements (e.g., pcell instances), for a user to manipulate the IC design layout. In some embodiments, the user interface 104 may include a text based interface allowing the user to enter manual commands for designing and optimizing the IC. Although this disclosure uses the generic term IC design tool, one having ordinary skill in the art should understand that the embodiments used herein are applicable to package design tools (detailed below) and printed circuit board (PCB) design tools. One having ordinary skill in the art should further understand that package design tools and PCB design tools may also be provided in the same system 100. In other words, the generic term IC design tool has been used for brevity and not with the intention to limit the scope this disclosure.

A server 102 may be accessible to the client device 101 via one or more networks 105. The server 102 may be any computing device comprising a processor and other computing hardware configured to execute an IC design tool 103 software module (e.g., EDA design software) that may analyze and optimize an IC design. In operation, using a client device 101 to access a design tool 103 hosted on a server 102 over a network 105, a circuit designer may interact with the IC design tool 103, through a number of input devices of the client device 101, such as by inputting a selection as with a mouse or inputting a request as with a keyboard. The IC design tool 103 may generate any number of graphical interface 104 responses based on the inputs received from the client device 101, and then send the data back to the client device 101 to be rendered on the GUI 104.

The server 102 may execute one or more component software modules of the IC design tool 103 software program, which may be a software program that allows users (e.g., engineers, circuit designers) to design and optimize circuit designs through software modules. The IC design tool 103 may provide users with interactive design interfaces 104 for designing an IC and the various design elements, execute automated optimization processes, and execute automated layout-generation processes. The server 102 may comprise, or may be in networked-communication with, non-transitory machine-readable media configured to store a netlist of or any other file including records of IC design elements, which may be a machine-readable computer file or a design database containing one or more records of design elements (e.g., circuit devices, pcells) of the IC design. In operation, the IC design tool 103 may analyze and optimize the design elements of the netlist or any other type of file associated with the IC design. Non-limiting examples of circuit devices may include memory devices (e.g., flops), combination logic gates (e.g., AND, OR, NOT, NOR, NAND, XOR), and multiplexers, among others. The netlist or any other type of file may also include records of a plurality of nets. The nets may be the records associated with the wires interconnecting the plurality of circuit devices.

The server 102 may include a design library 106 that is accessed by the IC design tool 103. The design library 106 may include instances of various circuit devices, for example, transistors used to layout an IC. In some embodiments, the design library 106 may include instances of pcells used by the IC design tool 103 to generate an IC layout. An instance of a pcell may represent electronic circuit components such as a transistor, transmission line, or an optical fiber line. The IC design tool 103 may use instances of pcells in the design library 106 to generate a netlist of an IC that can be sent to a manufacturing facility for fabrication.

The exemplary system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities).

The exemplary system may further be used to design an IC package. For example, the design library 106 may include both schematic and layout pcells for circuit components required to design an IC package, such as transmission lines, discrete circuit components, and embedded passive components in the transmission lines. The IC design tool 103 may instantiate one or more of these components in schematic (or symbolic) view and/or layout view. Furthermore, the IC design tool 103 may generate one or more IC packages design formed by the schematic pcells and layout pcells stored in the design library 106.

Various components of the system 100 may implement technology data independent layout pcell to solve a computer rooted problem arising in the realm of electronic design automation (EDA) system, more specifically integrated circuit (IC) package design. When the system 100 is being constructed, there may be no a priori knowledge of various layers in the technology file (shortened as "techfile") and the resolution in a future package layout. In other words, unlike the conventional EDA tools wherein the user is confined to the components standard library shipped with the tool or has to manually define a library for every single layer and resolution, the system 100 provides automated, customizable, and fluid pcells such that when a user instantiates the pcells, the pcells may pick up the environmental variables for an automatic customization.

Figure 2:
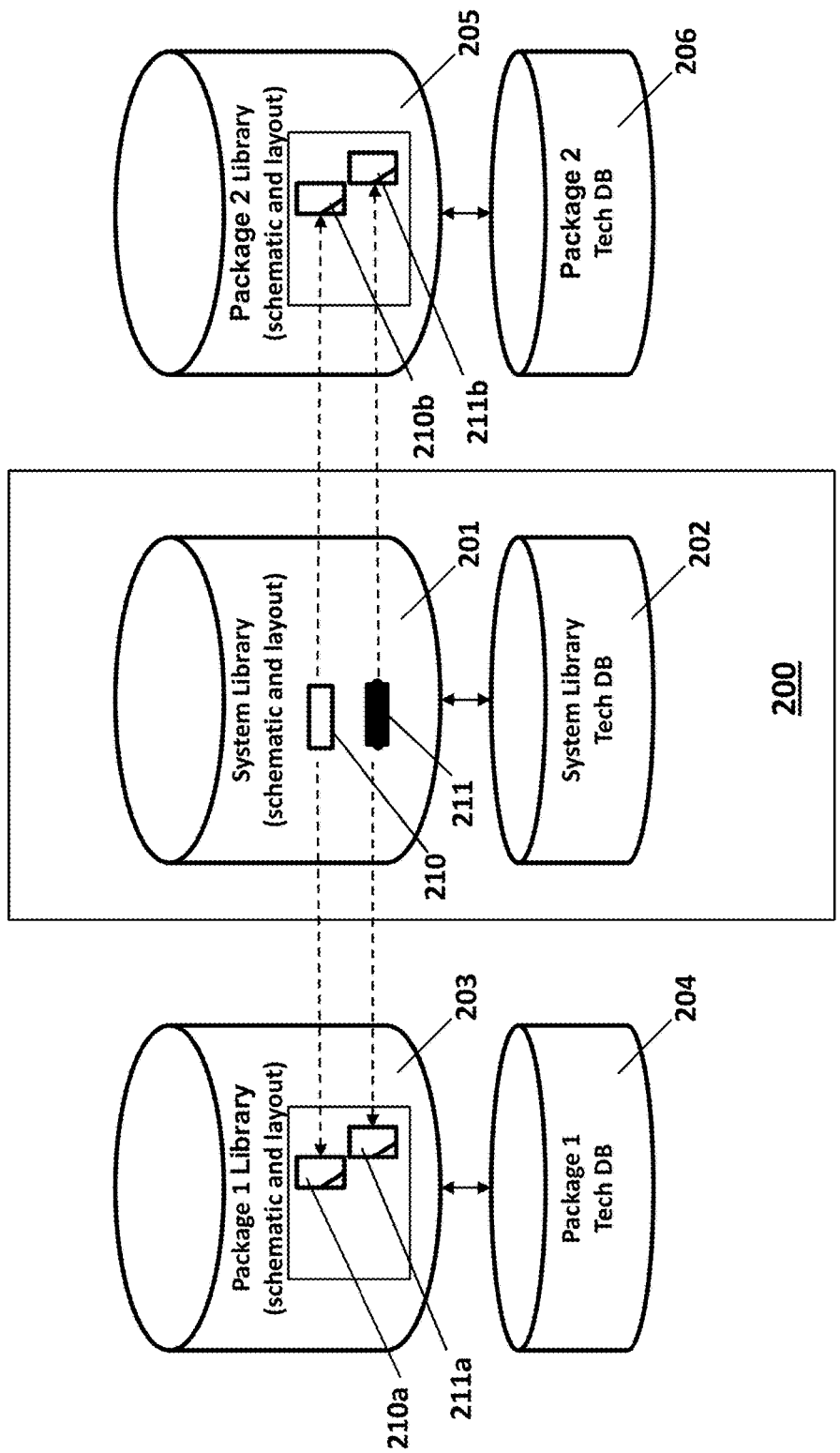
FIG. 2 shows an exemplary system implementing technology database independent pcells, according to an exemplary embodiment.

FIG. 2 shows an exemplary system 200 implementing technology database independent pcells, according to an exemplary embodiment. The exemplary system 200 may comprise a system library 201 that includes a plurality of layout and schematic (or symbolic) pcells and a system library technology database 202. Within the system library 201, an exemplary schematic pcell 210 and an exemplary layout pcell 211 are shown in FIG. 2. However, one having ordinary skill in the art understands that the system library 201 may include a plurality of both schematic pcells 210 and layout pcells 211. Non limiting examples of the pcells 210, 211 may include transmission lines, embedded passive components, and discrete components within an IC package design. Exemplary embedded passive components and discrete components may include inductors, capacitors, and resistors. The schematic pcells 210 and the corresponding layout pcells 211 may be installed closer together within the system library 201 such that an electronic design automation system (EDA) may generate a layout view from the schematic view and vice versa. As an example, a circuit designer may provide an input, such as clicking a button, to generate a layout view from the schematic view being rendered, and the EDA tool can query the layout pcells 211 using the information from the schematic pcells 210 and render the layout pcells 211 to generate a layout view. In other words, the structure of the IC package may be retained when toggling from the schematic view to layout view and vice versa. One having ordinary skill in the art understands that the components of the system 200 are merely exemplary and the system 200 may contain other substitute components or lesser number of components than shown in FIG. 2.

In some embodiments, the system library technology database 202 may include one or more technology files (or shortened as "techfiles") containing default technology information for the schematic pcells 210 and the layout pcells 211 in the system library 201. For example, for a schematic pcell 210 and/or a layout pcell 211, the respective technology file may include default layer name such as an empty string (" "), a default layer number such as zero, and a default resolution dbuPerUU (Database Unit per User Unit) of 100. As detailed in the embodiments below, these default values may change based upon the respective technology files of the technology database of the library that a schematic pcell 210 and/or a layout pcell 211 is instantiated on. The one or more techfiles may also contain other information such as design rule information, for example, minimum spacing between the components and minimum width of the components.

In addition to the information in the technology files in the system library technology database 202, the schematic pcells 210 and the layout pcells 211 in the system library 201 may include additional parameters such as an angle parameter and a parent cell library name defaulted to an empty string (" "). These additional parameters may be defined by a code, for example SKILL/SKILL++ code, within the pcells 210, 211. In addition to defining the parameters, the code in the pcells 210, 211 may define the functionality of the pcells 210, 211. Non-limiting example of the functionality may be the pcells 210, 211 querying and retrieving information about the parent cell hosting the pcells 210, 211 and storing the retrieved information within the pcell 210, 211. One having ordinary skill in the art appreciates that the information contained with a pcell code or the system library technology database 202 is merely exemplary and additional information or alternative information be present therein. One having ordinary skill in the art further appreciates that the pcell code may contain some or all of the information described above as being within the system library technology database.

A circuit designer may use instantiate the schematic pcells 210 to generate a package schematic in a library. The exemplary embodiment below describes a circuit designer using an EDA tool to instantiate schematic (or symbolic) pcells 210 to realize a schematic view and then retrieving the corresponding layout pcells 211 to realize a layout view. However, one having ordinary skill in the art understands that the circuit designer may begin with the layout view by instantiating layout pcells 211 and may convert the layout view to schematic view by retrieving the corresponding schematic pcells 210. Therefore, using these embodiment, the integrity of the IC package may not lost as the EDA toggles between schematic view and the layout view in contrast to the conventional system that flatten the circuit design while going from the schematic view to the layout view or vice versa.

In operation, a first circuit designer may construct a package 1 technology database 204 using an EDA tool, wherein the package 1 technology database 204 includes one or more technology files (abbreviated as "techfiles") storing the information pertaining to the layers of a first IC package. The information pertaining to the layers of the first IC package may include, for example, the number of layers, the name of layers, characteristics of materials in the layers, the resolution of the layout in the different layers, the minimum spacing required between the circuit components in different layers, and minimum width required for the circuit components in different layers. One having ordinary skill in the art appreciates that the system library 201 shipped with the system 200 does not have an a priori knowledge of the package 1 technology database 204.

The first circuit designer may instantiate a schematic (or symbolic) pcell 210 of the system library 201 to generate an instantiated schematic component 210a in a package from the package 1 library 203. The instantiated schematic pcell 210a may use a call back function coded within in the instantiated schematic pcell 210a to retrieve the library name of the parent cell hosting the instantiated schematic pcell 210a. In other words, the call back function executed by a code (for example SKILL code) in the instantiated schematic pcell 210a may retrieve the library name of the parent cell hosting the instantiated schematic pcell 210a. Continuing with this example, the instantiated schematic pcell 210a may use the call back function to retrieve the name of the package 1 library 203 and store the name of the package 1 library 203 within the instantiated schematic pcell 210a. In some implementation, the name of the package 1 library 203 may be hidden and may not visible to the circuit designer.

As the instantiated schematic pcell 210a contains the name of the package 1 library 203, the instantiated schematic pcell 210a may retrieve the address of package 1 technology database 204 from the name of the package 1 library 203. From the package 1 technology database 204, the instantiated schematic pcell 210a may retrieve the layer name of the parent cell hosting the schematic pcell 210a. In some embodiments, if the schematic pcell 210a is a transmission line symbolic pcell, the schematic pcell 210a may be implemented at the topmost layer of the IC package by default because transmission lines are generally routed at the topmost layer. In some embodiments, the first circuit designer may provide one or more inputs to change the default layer or the stored layer name in the schematic pcell 210a.

From the schematic view of the IC package, the first circuit designer may use the EDA tool to generate a layout view of the IC package. To facilitate the retrieval of the layout pcells 211 corresponding to the schematic pcells 210, the system library 201 may install the schematic pcells 210 close to the layout pcells 211. The EDA tool then instantiates the layout pcells 211 in the package 1 library 203 to generate the instantiated layout pcells 211*a*. In some embodiments, the instantiated layout pcells 211*a* may retrieve the layer name and library name stored in the corresponding instantiated schematic pcell 210*a*. In some embodiments, the instantiated layout pcells 211*a* may execute a code (for example SKILL code) within the layout pcells 211*a* to retrieve or update the library name or the layer name from the parent cells hosting the layout pcells 211*a*. Furthermore, the instantiated layout pcells 211*a* may retrieve the layer number corresponding to the layer name, the resolution, and/or other information such as design rule information of the package 1 library 203 from the techfiles within the package 1 technology database 204. Based on the layer number, the resolution, and/or other information, the instantiated layout pcells 211*a* may be instantiated with the correct geometry without requiring an action from the first circuit designer.

Therefore, in the aforementioned embodiments, the schematic pcells 210 and the layout pcells 211 provided by the system 200 are independent of the technology database. In other words, if the schematic pcells 210 are instantiated in the package 1 library 203 as instantiated schematic pcells 210*a*, the schematic pcells 210*a* may implement one or more hidden callback functions to retrieve one or more environmental variables, such as layer name, from the package 1 technology database 204 and store the layer name within the schematic pcells 210*a*. Furthermore, when the corresponding layout pcells 211*a* are instantiated, the layout pcells 211*a* may receive the layer name and library name from the schematic pcells 210*a*. Using the library name and the layer name, the layout pcells 210*a* may query the package 1 technology database 204 to retrieve the layer number, resolution, and/or other information such as design rule information of the package 1 library 203 and configure the layout geometry based upon the layer number, resolution, and/or other information. Similarly, if the schematic pcells 210 are instantiated in a package schematic from the package 2 library 205 as instantiated schematic pcells 210*b*, the schematic pcells 210*b* may implement one or more hidden callback functions to retrieve one or more environmental variables, such as layer name, from the package 2 technology database 206 and store the layer name within the schematic pcells 210*b*. Furthermore, when the corresponding layout pcells 211*b* are instantiated, the layout pcells 211*b* may receive the layer name and library name from the schematic pcells 210*b*. Using the library name and the layer name, the layout pcells 210*b* may query the package 2 technology database 206 to retrieve the layer number, resolution, and/or other information such as design rule information of the package 2 library 205 and configure the layout geometry based upon the layer number and the resolution. One having ordinary skill in the art therefore should appreciate that the system library 201 may be constructed without knowing the specifics of package 1 library 203 and the package 1 technology database 204 or the package 2 library 205 and the package 2 technology database 206.

Figure 3:
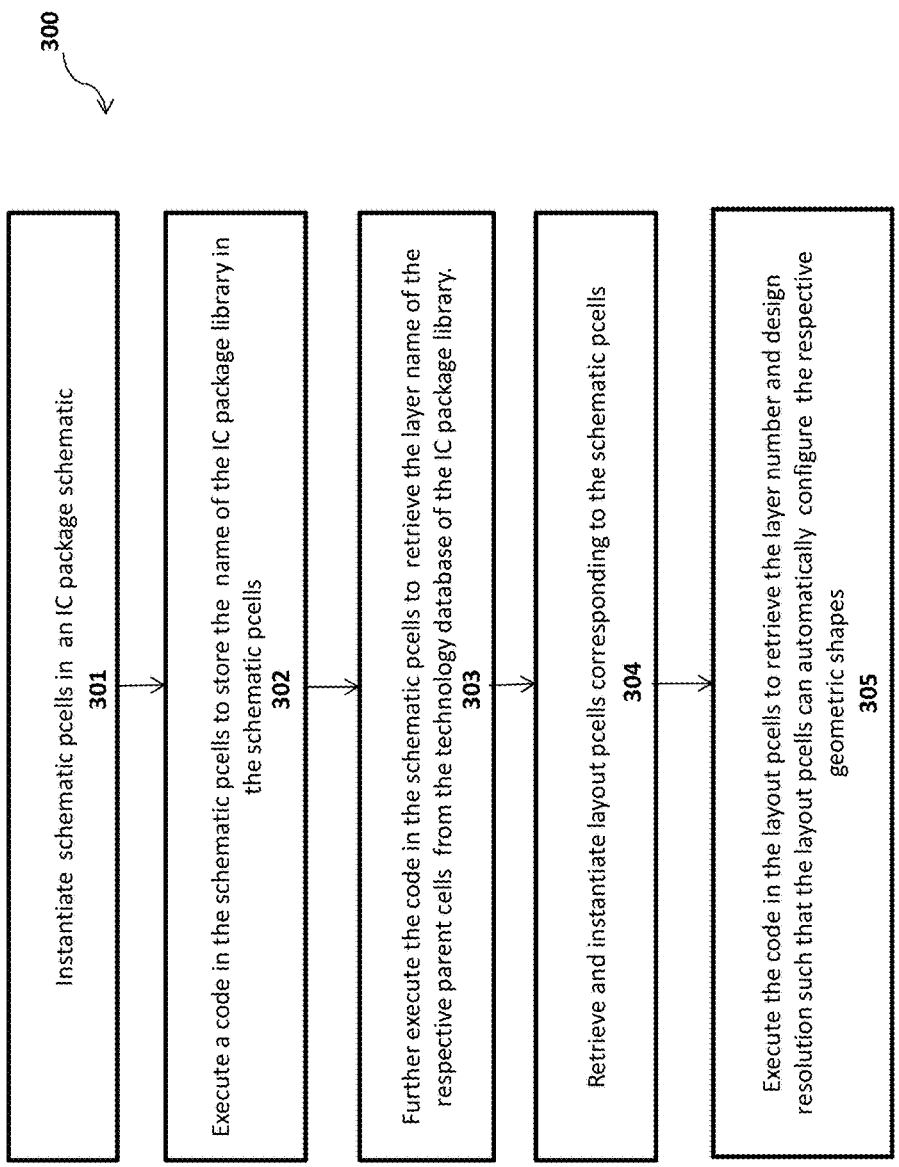
FIG. 3 shows an exemplary method of instantiating and customizing technology database independent pcells, according to an exemplary embodiment.

FIG. 3 shows an exemplary method 300 for implementing technology database independent pcells, according to an exemplary embodiment. Although one or more computing devices and one or more databases may implement one or more steps of the method 300, the following description details, for brevity, a computer system implementing the steps of the method 300. One having skill in the art will appreciate that some embodiments may comprise additional or alternative steps, or may omit several steps altogether.

In a first step 301, the computer system may instantiate schematic pcells in an IC package schematic. For example, a circuit designer may instruct the computer system to generate a symbolic view of an IC package, and the computer system may instantiate schematic pcells from a system library. Non-limiting examples of the circuit devices represented by the schematic pcells may be radio frequency (RF) transmission lines, embedded passive devices within the transmission lines such as inductors and capacitors, and discrete electrical devices.

In a next step 302, the computer system may execute a code in the schematic pcells to store the name of the IC package library in the schematic pcells. In some embodiments, the code may be written using the SKILL/SKILL++ scripting language. Upon execution of the code, the schematic pcells may query the respective parent cells hosting the schematic pcells to retrieve the name of the IC package library containing the parent cells. The schematic pcells may further store the name of the IC package library within the schematic pcells. In some embodiments, the name of the IC package library is hidden from the circuit designer or other user of the computer system.

In a next step 303, the computer system may further execute the code in the schematic pcells to retrieve the layer name of the respective parent cells from the technology database of the IC package library. For example, the code in the schematic pcells may query one or more techfiles in the technology database to retrieve the layer name of the respective parent cells hosting the schematic pcells. The schematic pcells may then store the layer name within the schematic pcells. In some embodiments, the layer name may be strings assigned to various layers in the IC package library. In some embodiments, the layer name may be hidden to the circuit designer or other user of the computer system. In some embodiments where the technology database does not have a layer name, the computer system may generate an error marker to notify the circuit designer and eventually draw the layout pcells in a phantom layer.

In a next step 304, the computer system may retrieve and instantiate layout pcells corresponding to the schematic pcells. For example, a circuit designer may provide one or more instructions to the computer system to generate a layout view from the symbolic view rendering the schematic pcells. In some embodiments, the layout pcells are installed in association with the corresponding schematic pcells in the system library, and the computer system may query the system library using the information from the schematic pcells to retrieve the corresponding layout pcells. The computer system may further instantiate the layout pcells within the corresponding parents cells in the IC package library. Upon instantiation of the layout pcells, the computer system may transmit the stored library name and layer name from the corresponding schematic pcells to the layout pcells.

In a next step 305, the computer system may execute the code in the layout pcells to retrieve the layer number, the design resolution, and other information such as design rule information (e.g. minimum spacing and width) such that layout pcells can intelligently configure the respective geometric shapes. For example, the layout pcells through the execution of the code can query the one or more techfiles in the technology database of the IC package to retrieve the layer number, the design resolution, and/or other information. Based on the layer number, the design resolution, and/or the other information the layout pcells can configure their geometric parameters such as length, width, and thickness.

Figure 4A:
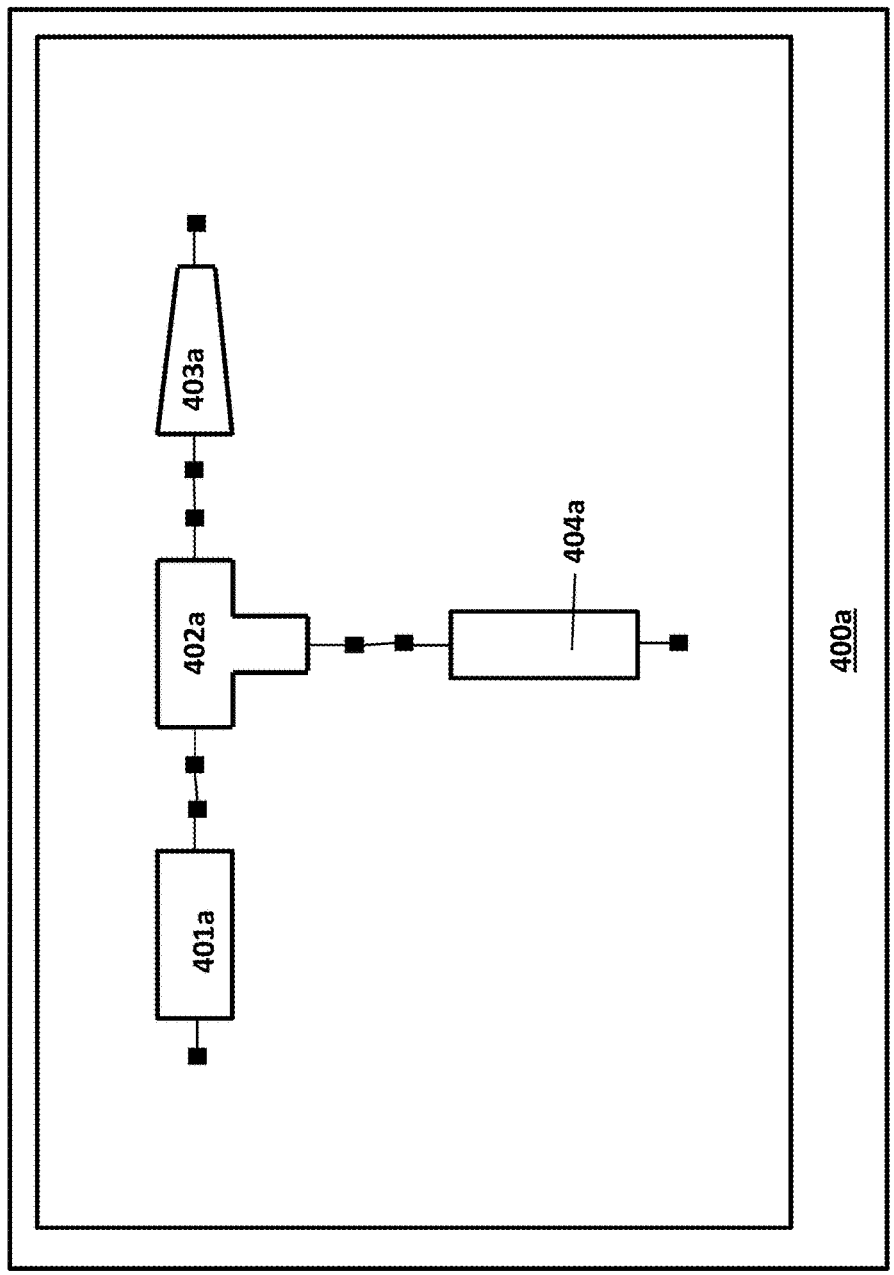
FIG. 4A shows an exemplary GUI rendering a schematic view of technology database independent pcells, according to an exemplary embodiment.

FIG. 4A shows an exemplary graphical user interface (GUI) 400a showing a schematic view generated by an electronic automation (EDA) system, according to an exemplary embodiment. In this schematic view, the EDA system has rendered various symbolic cells of instances of transmission line, linear transmission line instances 401a, 401b, a T-junction transmission line instance 402a, and a stopper transmission line instance 402. The T-junction transmission line instance 402a may connect three transmission lines instances 401a, 403a, 404a. The stopper transmission line instance 403a may have a longer width on one side and a shorter width on the other side. The EDA system may instantiate the transmission line instances 401a, 402a, 403a, 404a based upon the estimates of geometrical parameters (e.g. length and width) and electrical characteristics of the material forming the transmission lines 401a, 402a, 403a, 404a, wherein some of these parameters may be provided by a circuit designer.

In some embodiments, the EDA system may instantiate the transmission line instances 401a, 402a, 403a, 404a as schematic pcells from a system library of the EDA system. The schematic pcells may have an embedded code that may execute in the EDA system upon instantiation of the schematic pcells. Executing the embedded code may cause the pcells to query the parent cells hosting the respective pcells to retrieve the IC package library name of the parent cells and store the package library name in the pcells. Furthermore, the pcells may query the technology database associated with the IC package library to retrieve the layer name of the respective parent cells hosting the schematic pcells and store the layer name in the pcell. For transmission line instances such as 401a, 402a, 403a, 404a the pcell may store the name of the top layer of the IC package as a default layer because transmission lines may usually be routed from the topmost layer in the IC package. In some embodiments, the name of the IC package library may be hidden and the layer name may be visible.

Figure 4B:
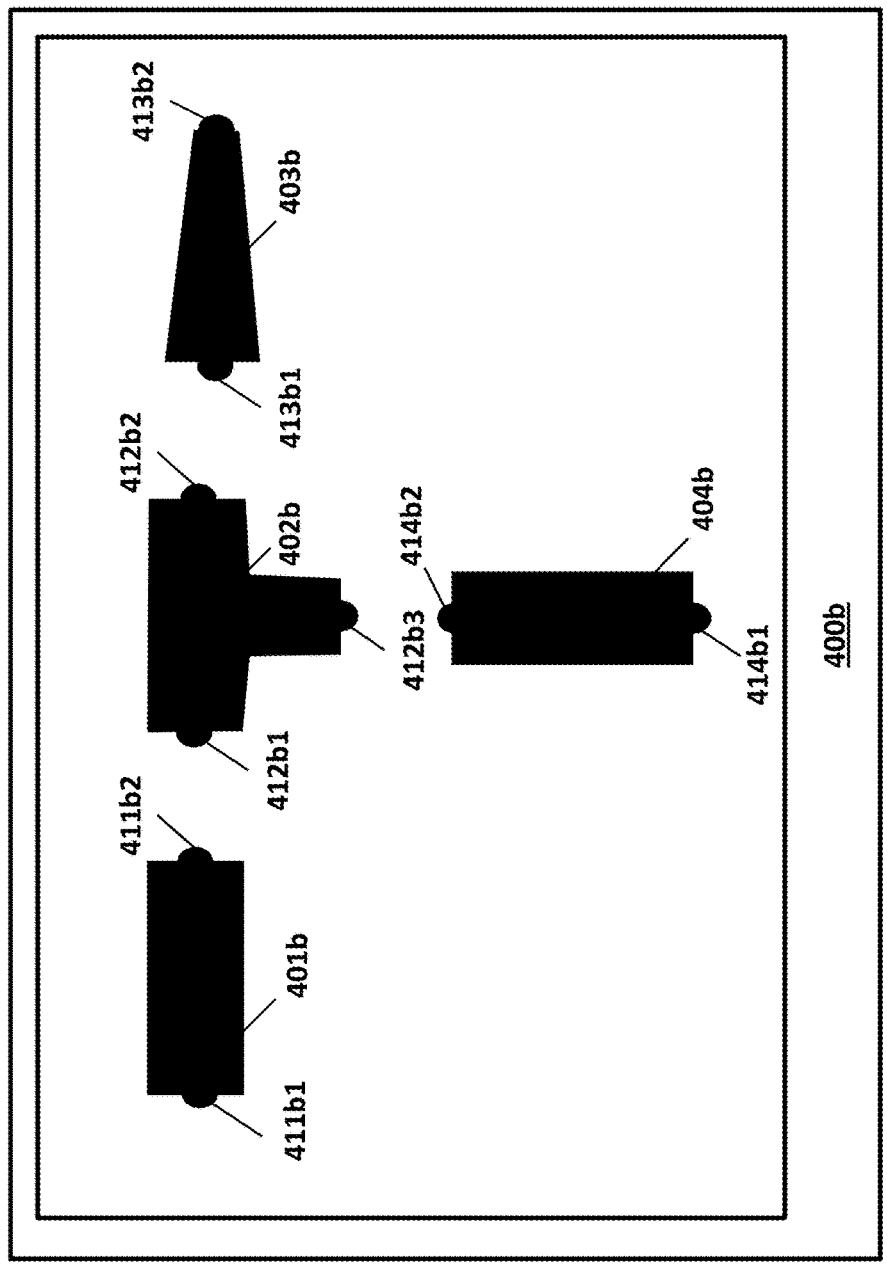
FIG. 4B shows an updated exemplary GUI rendering a layout view of technology database independent pcells before abutment, according to an exemplary embodiment.

FIG. 4B shows an exemplary updated GUI 400b generated by the EDA system showing a layout view based upon the above described schematic view shown in FIG. 4A, according to an exemplary embodiment. More specifically, the EDA system may generate layout pcell instances from the above described symbolic cells and render the layout pcell instances in the updated GUI 400b. For example, from the transmission line instances 401a, 402a, 403a, 404a, the EDA system may generate the layout pcells instances 401b, 402b, 403b, 404b respectively. In some embodiments, the EDA system may query the system library to retrieve the layout pcells instances 401b, 402b, 403b, 404b and render the updated GUI 400b containing the layout pcells instances 401b, 402b, 403b, 404b. In other embodiments, a circuit designer may provide one or more inputs to the EDA system to identify a layout pcell library corresponding to the schematic library containing the instances of symbolic cells rendered in the GUI 400a.

Each of the layout pcell instances 401b, 402b, 403b, 404b may receive the stored IC package library name and the layer name from the corresponding schematic pcells implementing the transmission line instances 401a, 402a, 403a, 404a. Based on the IC package library name and the layer name, embedded code within each of the layout pcell instances 401b, 402b, 403b, 404b may query the technology database associated with the IC package library, more particularly one or more technology files within the technology database to retrieve the layer number corresponding to the layer name. Furthermore, the embedded code with the layout pcell instances 401b, 402b, 403b, 404b may retrieve the design resolution of the IC package library. In addition, the embedded code within the layout pcell instances 401b, 402b, 403b, 404b may retrieve other information such as design rule information, for example minimum spacing and width, of the IC package library Based on the layer number, resolution, and/or the other information in the one or more technology files, the pcell 401b, 402b, 403b, 404b may configure a correct geometry as shown in the updated GUI 400b. In addition, to allow for abutment, the each of the layout pcell instances 401b, 402b, 403b, 404b may configure one or more connection points based on the one or more technology files points to aid an abutment engine executed by the EDA system. For example, as rendered by the EDA system in the GUI 400b, the linear transmission line layout pcell instance 401b may have two connection points 411b1, 411b2; the T-junction transmission line layout pcell instance 402b may have three connection points 412b1, 412b2, 412b3, the stopper transmission line pcell instance 403b may have two connection points 413b1, 413b2; and the linear transmission line pcell instance 404b may have two connection points 414b1, 414b2. When a circuit designer positions the layout pcells closer together, the EDA system may execute the abutment engine to abut the layout pcells. For example, if the connection point 411b2 of the linear transmission line layout pcell 401b is overlaps the connection point 412b2 of the T-junction transmission line layout pcell 402b, the abutment engine may abut the linear the linear transmission line layout pcell 401b and the T-junction transmission line pcell 402b.

Figure 4C:
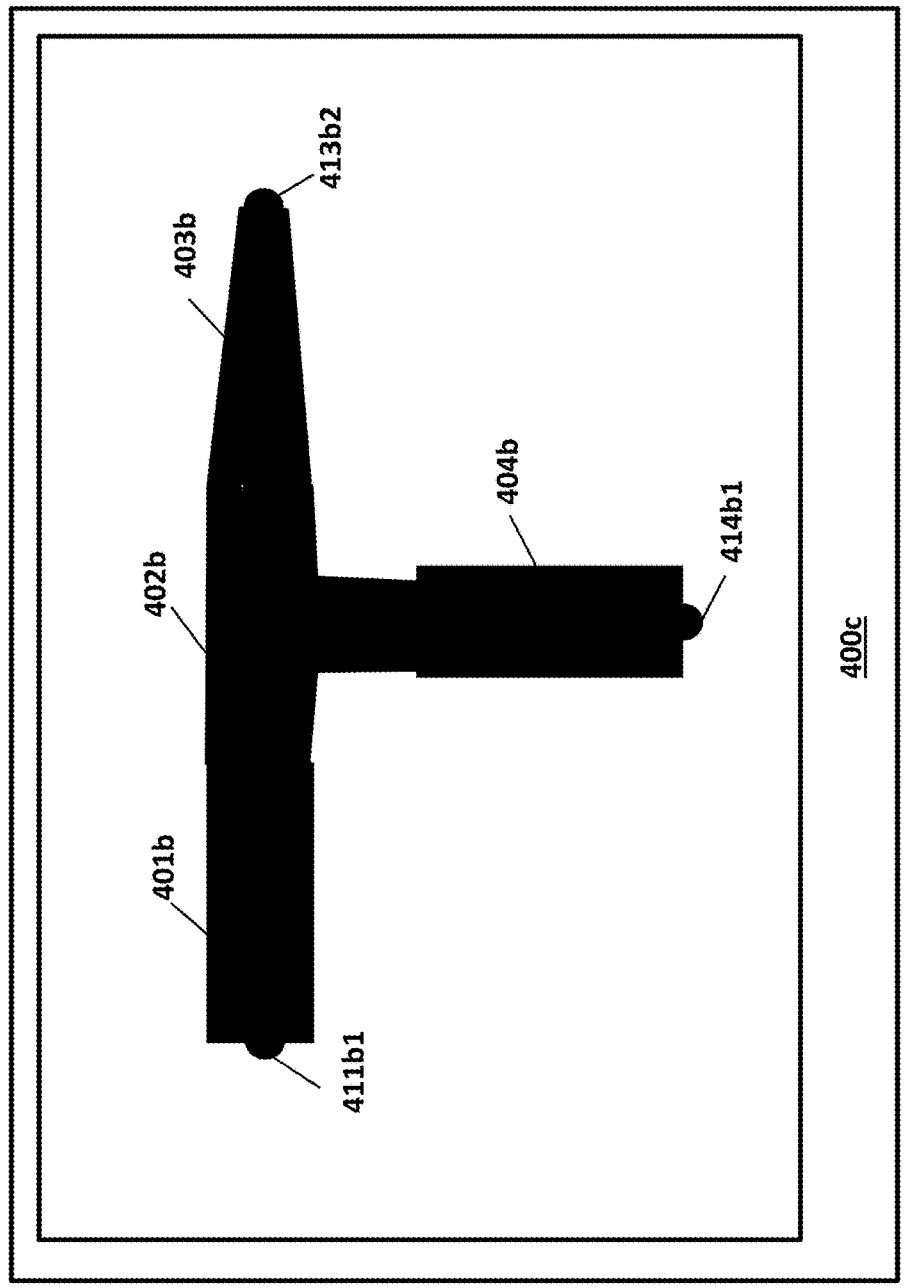
FIG. 4C shows an exemplary GUI rendering a layout view of technology database independent pcells after abutment, according to an exemplary embodiment.

FIG. 4C shows an updated exemplary GUI 400c generated by the EDA system after abutting the transmission lines layout pcell instances 401b, 402b, 403b, 404b. One having ordinary skill in the art understands that the EDA system may use the unabutted connection points 411b1, 413b2, 414b1 to abut the respective transmission line pcell instances 401b, 403b, 404b with other transmission line pcell instances or passive device pcell instances not rendered by the exemplary GUI 400c. One having ordinary skill in the art further understands that although the aforementioned embodiments describe transmission line pcells, the embodiments are equally application to passive and/or embedded devices in an integrated circuit package.

In some embodiments, the EDA tool may update a symbolic cell parameter based on an update of a layout cell parameter. For example, in the embodiments implementing the transmission line layout pcell instances 401b, 402b, 403b, 404b, a circuit designer may update a parameter of one or more of transmission line layout pcell instances 401b, 402b, 403b, 404. For instance, a circuit designer may manually expand or shrink the geometry of one or more of the transmission line layout pcell instances 401b, 402b, 403b, 404b, and the respective embedded code may update the geometric parameters in the corresponding transmission line layout pcell instances 401b, 402b, 403b, 404b. Based on these updated parameters, the EDA tool may update the same parameters of the corresponding symbolic pcells.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
    instantiating, by the computer, a schematic parameterized cell (pcell) within a parent cell of an integrated circuit (IC) package design;
    executing, by the computer, one or more programs coded within the instantiated schematic pcell such that upon execution of the one or more programs the instantiated schematic pcell stores a name of the IC package library associated with the IC package design;
    further executing, by the computer, the one or more programs coded within the instantiated schematic pcell such that the instantiated schematic pcell retrieves a layer name of the parent cell from one or more technology files in a technology database associated with the IC package library;
    instantiating, by the computer, a layout pcell corresponding to the schematic pcell within the parent cell;
    executing, by the computer, one or more programs coded within the instantiated layout pcell such that upon execution of the one or more programs the instantiated layout pcell retrieves a layer number and a resolution of the IC package design from the technology database; and
    further executing, by the computer the one or more programs coded within the instantiated layout pcell such that the instantiated layout pcell is shaped with a geometry based upon the layer number and the resolution of the IC package design.

2. The method of claim 1, wherein each of the schematic pcell and layout pcell represent circuit devices selected from the group consisting of radio frequency transmission line, a discrete electrical component, and a passive embedded electrical component.

3. The method of claim 2, wherein one or more of the discrete electrical component and the passive embedded electrical component from the group consisting of an inductor, a capacitor, and a resistor.

4. The method of claim 1, wherein the default resolution of the instantiated layout pcell is set at database unit per user unit (dbuPerUU) of 100.

5. The method of claim 1, wherein the default layer name for the instantiated schematic pcell is configured as the name of the topmost layer in the IC package.

6. The method of claim 1, wherein the instantiated schematic pcell is a part of a symbolic view and wherein the second request is a request to generate a layout view corresponding to the symbolic view.

7. The method of claim 1, wherein each of the instantiated schematic pcell and the instantiated layout pcell is configured to hide the name of the IC package library.

8. The method of claim 1, further comprising:
querying, by the computer, a system library to retrieve a layout pcell corresponding to the instantiated schematic pcell.

9. The method of claim 1, further comprising:
rendering, by the computer, a symbolic view showing at least the instantiated schematic pcell in graphical user interface; and
upon receiving an instruction to generate a layout view corresponding to the symbolic view:
rendering, by the computer, a layout view showing at least the instantiated layout pcell in the graphical user interface.

10. The method of claim 1, further comprising:
abutting, by the computer, the instantiated layout pcell with a second instantiated layout pcell proximate to the instantiated layout pcell.

11. A computer based system, comprising:
one or more computers comprising a non-transitory machine-readable media configured to store an integrated (IC) package library, a technology database associated with the IC package library, and a system library comprising a plurality of schematic parameterized cells (pcells) and corresponding layout pcells;
at least one computer of the one or more computers, the at least one computer coupled to the non-transitory machine-readable media and comprising a processor configured to:
instantiate a schematic pcell within a parent cell of an integrated circuit (IC) package design;
execute one or more programs coded within the instantiated schematic pcell such that upon execution of the one or more programs the instantiated schematic pcell stores a name of the IC package library associated with the IC package design;
further execute the one or more programs coded within the instantiated schematic pcell such that the schematic pcell retrieves a layer name of the parent cell from one or more technology files in the technology database associated with the IC package library;
instantiate a layout pcell from the system library corresponding to the schematic pcell within the parent cell;
execute one or more programs coded within the instantiated layout pcell such that upon execution of the one or more programs the instantiated layout pcell retrieves a layer number and a resolution of the IC package design from the technology database; and
further execute the one or more programs coded within the instantiated layout pcell such that the instantiated layout pcell is shaped with a geometry based upon the layer number and the resolution of the IC package design.

12. The system of claim 11, wherein each of the schematic pcell and layout pcell represent circuit devices selected from the group consisting of radio frequency transmission line, a discrete electrical component, and a passive embedded electrical component.

13. The system of claim 12, wherein one or more of the discrete electrical component and the passive embedded electrical component from the group consisting of an inductor, a capacitor, and a resistor.

14. The system of claim 11, wherein the default resolution of the instantiated layout pcell is set at database unit per user unit (dbuPerUU) of 100.

15. The system of claim 11, wherein the default layer name for the instantiated schematic pcell is configured as the name of the topmost layer in the IC package.

16. The system of claim 11, wherein the instantiated schematic pcell is a part of a symbolic view and wherein the second request is a request to generate a layout view corresponding to the symbolic view.

17. The system of claim 11, wherein each of the instantiated schematic pcell and the instantiated layout pcell is configured to hide the name of the IC package library.

18. The system of claim 11, wherein the processor is further configured to:
query the system library to retrieve a layout pcell corresponding to the instantiated schematic pcell.

19. The system of claim 11, wherein the processor is further configured to:
render a symbolic view showing at least the instantiated schematic pcell in graphical user interface; and
upon receiving an instruction to generate a layout view corresponding to the symbolic view:
render a layout view showing at least the instantiated layout pcell in the graphical user interface.

20. The system of claim 11, wherein the processor is further configured to:
abut the instantiated layout pcell with a second instantiated layout pcell proximate to the instantiated layout pcell.

* * * * *